2,828,331

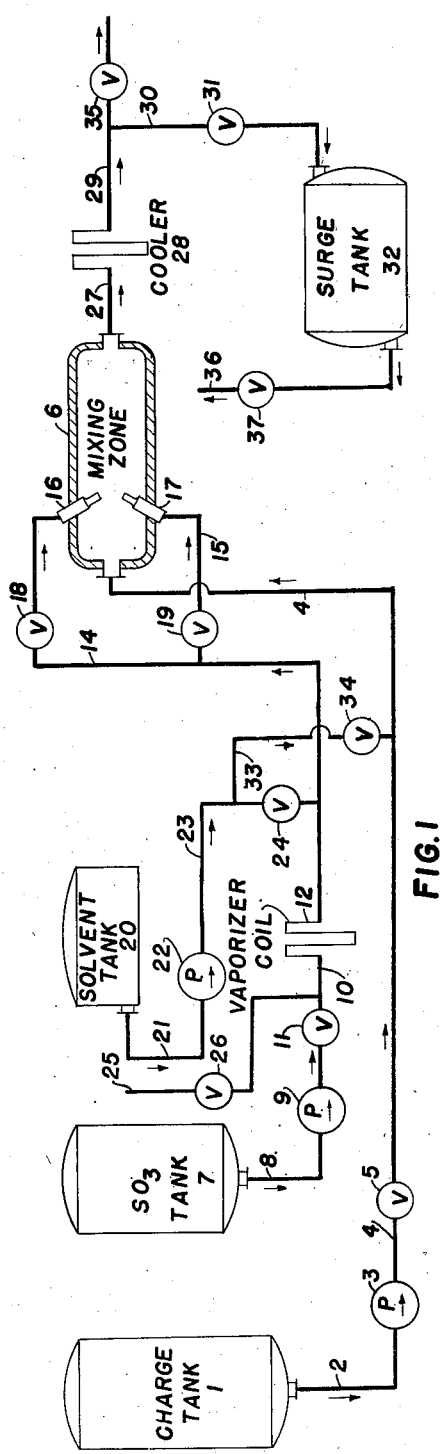
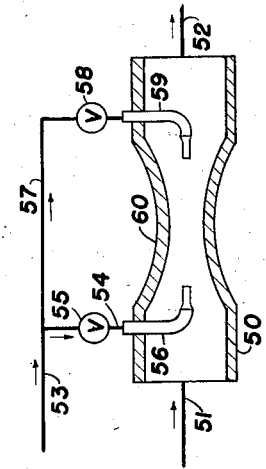
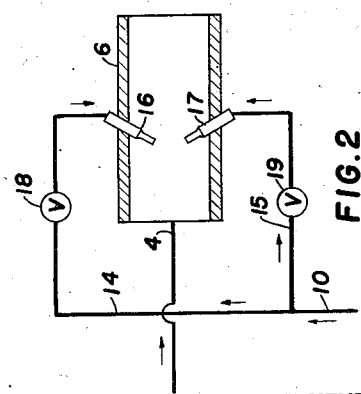
INVENTORS.
MILTON M. MARISIC
BY LE ROI E. HUTCHINGS
ATTORNEY

United States Patent Office 2,828,331
Patented Mar. 25, 1958

SULFONATION OF PETROLEUM OILS

Milton M. Marisic, Elgin, and Le Roi E. Hutchings, Crystal Lake, Ill., assignors to The Pure Oil Company, Chicago, Ill., a corporation of Ohio Application September 26, 1956, Serial No. 612,132

7 Claims. (Cl. 260—504)

This invention relates to a process for the sulfonation of sulfonatable materials, particularly lubricating oils and fractions thereof, wherein the utilization of certain mixing, pressure and temperature conditions brings about increased yields of total acids, i. e., petroleum sulfonic acids, and of mahogany sulfonic acids.

Accordingly, the main object of this invention is to provide a new and simple method of preparing petroleum sulfonic acids, having low contents of green and inorganic acids, in high yields.

A further object is to provide a process wherein certain conditions of temperautre, pressure drop, stream velocity, and solvent/oil ratio are used during the immediate and thorough mixing of the oil with the sulfonating agent whereby the yield of mahogany sulfonic acids is increased, same being peculiarly adapted for use in preparing lubricating oil additives.

A further object of this invention is to provide a method and apparatus for sulfonating hydrocarbon materials whereby heat buildup and undesirable side reactions, for instance, oxidation and multiple sulfonation are minimized and the ratio of mahogany-to-green sulfonic acids in the resultant product is increased over that formerly attainable.

Another object is to provide a process and apparatus for the preparation of sulfonic acids from mineral oils employing a particular solvent and solvent-oil ratio, and particular pressure drop at the point of introduction of the sulfonating agent, to produce increased yields of mahogany acids at temperatures normally conducive to green acid formation.

Additional objects such as reduction or elimination of corrosion of the apparatus will become apparent as the description thereof proceeds. The invention comprises, therefore, a combination of process steps and their relation to each other as hereinafter more fully explained.

The drawings are diagrammatic flow representations of the apparatus to be used in carrying out this invention.

Figure 1 is a general flow diagram of the process with the reactor shown in cross-section.

Figure 2 is a cross-sectional fragmentary view of one form of reactant mixing vessel employing a plurality of opposed injection nozzles directing streams of sulfonating agent into a common mixing zone against the flow oil.

Figure 3 is a cross-sectional fragmentary view of another form of reactant mixing vessel employing a right-angle turn for the flow of oil with an injection nozzle for the sulfonating agent positioned either with or against such flow.

Figure 4 represents a cross-sectional fragmentary view of another form of reactant mixing apparatus showing a constriction in the oil flow path with a cooperating injection nozzle causing sulfonating agents to flow with or against the flow of oil through the restriction.

It is known in the art that oil-soluble mixtures of both mahogany and green sulfonic acids in lubricating oils can be prepared by contacting a mineral lubricating oil with fuming sulfuric acid, or other sulfonating agent such as sulfur trioxide, with or without the use of a solvent such as sulfur dioxide or various chlorinated hydrocarbons. The reaction is generally conducted between about 10° F. to as high as 150° F. The reaction is exothermic and at the higher reaction temperatures the formation of the sulfonic acids is completed in a relatively short time; however, the products contain a predominance of the "green" sulfonic acids under these conditions. Monosulfonation to form the desirable mahogany acids is favored by lower temperatures, but such processing requires refrigeration, as through the evaporation of the sulfur dioxide. Where sulfur trioxide is used as the sulfonating agent, there exist other special techniques for introducing the sulfur trioxide into the sulfonation reactor, i. e., by suspension in an inert carrying medium such as a low-boiling hydrocarbon. Another technique is to employ the sulfur trioxide and sulfur dioxide in the gaseous phase, whereby the green acids and $SO_2$ separate out as a sludge in a first settling chamber and no sulfur dioxide stripping is employed. Such processes are described in United States Patents 2,381,708, 2,084,506, 2,448,370, 2,616,936, 2,514,733, 2,358,774, 2,706,736, 2,285,390, and Re. 22,548.

These previous methods have had the disadvantage of requiring reduced temperatures to achieve good results, and have had the further disadvantage of producing significant quantities of sludge and less desirable green acids, in spite of the reduced temperatures, with concomitant reduction in yield of the preferred mahogany acids. Some invesitgators have taught that thorough mixing of the sulfonating agent and oil is essential and require that the sulfonating agent and oil be brought "into confluence" or be mixed with fast-moving impellers. It will be shown that the methods taught do not produce products of as high quality as those of the instant invention. It has been found in accordance with the present invention that the disadvantages of the prior art processes can be overcome by employing high pressure streams to convey the sulfonating agent into contact with the oil, provided certain conditions of pressure drop and solvent-to-oil and solvent-to-sulfur trioxide ratios are maintained.

As is known, the use of fuming sulfuric acid as a sulfonating agent possesses certain disadvantages. First, only the free sulfur trioxide present enters into the reaction, and second, not only does the unused acid present a disposal problem, but the acid phase created by its use tends to carry with it a portion of the sulfonic acids from the oil and prevent the economical recovery of same. Sulfur trioxide when used as sulfonating agent is 100% reactive, but must be diluted or used as a complex compound to prevent over-heating and consequent oxidation to produce sulfur dioxide, water, olefins and/or tarry materials. Use of a "wetted wall" column employing the sulfur trioxide in vapor form diluted with an inert gas, such as nitrogen or sulfur dioxide, is fairly efficient but the column frequently plugs with tarry material due to excessive oxidation. Another technique using batch sulfonation, with greater dilution of gaseous sulfur trioixde with gaseous sulfur dioxide and longer contact times, fails to substantially reduce oxidation. The use of liquids such as ethylene chloride as solvents for the oil in such processes reduces the oxidation but does not eliminate disulfonation. If liquid sulfur dioxide is used to dilute both the hydrocarbon oil and the sulfur trioxide, a problem of thorough contact of reactants is presented because of the fact that the oil and sulfur dioxide are not miscible at the required low temperatures. However, this latter technique possesses the advantage that the sulfur trioxide is soluble in liquid sulfur dioxide at the boiling point of sulfur dioxide, namely 14° F. Consequently, solutions containing 16–25% sulfur trioxide at atmospheric pressure effectively control the reaction temperature, thereby reducing the oxidation. However, all of the various techniques are deficient in that they do not reduce the amount of disulfonation. Consequently, the techniques of vapor-liquid sulfonation with gaseous sulfur trioxide and sulfur dioxide, liquid-liquid sulfonation in ethylene chloride, and liquid-liquid sulfonation in sulfur dioxide were discarded as solutions to the problem, based on exhaustive experimentation.

In a number of experiments using various methods to sulfonate a 200 vis., 85 VI neutral oil, or a 170 vis., 100 VI neutral oil, it was found that the best results were obtained using a sulfur trioxide treat of between about 4 to 8%, based on the weight of oil, to form sulfonic acids with the greatest utilization of sulfur trioxide and the highest yield of mahogany acids. At a treating level of 15 wt. % of sulfur trioxide, severe oxidation and disulfonation resulted to the extent that the sulfonates produced after neutralization was completed could not be recovered for testing. Using the optimum degree of treatment in the sulfonic acid preparation step, and purified barium hydroxide during the neutralization, the best sulfonate salt was produced using a volume ratio of sulfur dioxide to oil of about 2.0 Not only was the calculated acid number of the sulfonic acid product increased to economic levels of between about 46.4 to 52.4, but the product quality was not seriously affected. In exploring the effect of heating during the sulfonation step, or removing the sulfur dioxide, on the yield and quality of sulfonates at the optimum conditions found, it was established that although the ash content and base number of the product were not adversely influenced by the use of temperatures above room temperature, there was a loss of product quality by removal of sulfur dioxide at 100° F. or above.

Experiments also proved that there was a decided effect on quality of petroleum sulfonates brought about by the condition and purity of the neutralizing base employed. Commercial barium oxide monohydrate, unpurified barium hydroxide octahydrate, and the use of a two-step neutralization with barium carbonate followed by unpurified barium hydroxide all produced sulfonates having less desirable characteristics. However, when a purified barium hydroxide was used, an improved product was obtained.

In addition to the above considerations, it was found to be desirable both from the standpoint of yield and performance in an engine to leave the green sulfonic acids which were soluble in the finished sulfonate in the final product. For the more viscous oils used as the sulfonatable material, the highest detergency of the sulfonates as measured by a bench detergency test was obtained using reagent grade barium hydroxide and neutralizing with amounts of base such that the ratio of barium as base to total barium in the product was about 0.31. For less viscous oils, the best ratio was about 0.22 using purified barium hydroxide. Although the calculated acid number of the sulfonic acids produced was substantially the same when using different lubricating oil feeds, one series of experiments pointed to the conclusion that the quality of the sulfonates therefrom decreased as the viscosity of the oil increased.

From these findings, a method was devised by which sulfonates were prepared, using sulfur trioxide, which were highly detergent and useable industrially as such, and were also capable of carrying lubricating oil bases through the L-1 diesel test for engine cleanliness. The main feature of this invention is the instantaneous dispersion of the sulfonating agent throughout a flowing stream of oil, diluted with solvent, by means of a submerged, high-pressure spray nozzle, or a plurality of said nozzles, operating in a common mixing zone.

Referring to the drawings, the process of the invention may be carried out in the following manner, specific details of which will be described subsequently. Charge oil is transferred from the charge tank 1 through line 2, by pump 3 into line 4 controlled by valve 5, and thence into mixing and reaction zone 6 wherein it mixes with sulfur trioxide coming from tank 7. The sulfur trioxide passes through line 8, and is forced by pump 9 into line 10, controlled by valve 11, into vaporizer coil 12, and finally into branch lines 14 and 15, communicating with spray nozzles 16 and 17 and controlled by valves 18 and 19, leading into zone 6. Any number of spray nozzles may be used in zone 6 as long as they all spray the sulfonating agent into a common zone. Vaporizer coil 12 may or may not be used depending on the reaction conditions desired. Solvent, such as liquid sulfur dioxide, or ethylene chloride, or both, is introduced into the system from tank 20, via line 21, forced by pump 22 into line 23 controlled by valve 24, and is mixed with the sulfur trioxide in line 10. When the sulfur trioxide is introduced in the gaseous phase by utilization of coil 12, a gaseous inert diluent, such as nitrogen, is introduced into line 10 via line 25 by means of pressure controller 26, in which event it is not necessary to use a solvent with the sulfur trioxide.

Reaction and mixing zone 6 may be of any suitable size or shape, used horizontally or vertically, and several embodiments thereof are shown in Figures 2, 3 and 4. In these embodiments the flow of oil to be sulfonated may be in either direction, although the flow shown in the drawings is from left to right as indicated by the arrows. Reactor 6 is designed so that the flow of oil is turbulent in the area of the injection nozzles or sprays 16 and 17. This may be accomplished by suitable baffling (not shown) or by maintaining the Reynolds number of the flowing oil and sulfonation agent therethrough at a value of over about 3000. The nozzles 16 and 17 may terminate so as to force, or spray, the sulfonating agent against the flowing, turbulent oil stream, or may terminate so that the spray therefrom is directed generally in the same direction as the oil stream.

From reaction zone 6, the reaction mixture passes through line 27 into cooler 28, via lines 29 and 30 and pressure controller 31, into surge-tank 32. Because of the efficiency of the spray process, the sulfonation may be conducted by a once-through treatment at temperatures sufficient to complete the reaction in the mixing zone. The product is withdrawn at line 29 via valve 35, or at line 36 via valve 37, for solvent recovery and purification. Surge-tank 32 provides additional time of contact between reactants to assure completion of the reaction if the reaction is carried out at lower temperatures, and/or if more time is necessary than is afforded by residence in reaction zone 6, line 27, cooler 28, and line 29. Solvent may be added to the incoming charge oil in line 4 by passage through branch line 33 controlled by valve 34.

Referring to Figure 2, which is a rearrangement of the nozzles and reaction zone 6 shown in Figure 1, spray nozzles 16 and 17 from manifolds 14 and 15 are shown directed against the flowing oil stream. This arrangement gives added assurance of turbulent flow and intimate mixing. Nozzles 16 and 17 may be located in the same plane within reaction zone 6, but are preferably located in different planes so that there will be less overlapping of sulfonating areas. This result can be accentuated by providing more nozzles located at 60° or 90° intervals around the longitudinal axis of zone 6, all having their sprays directed into a common mixing zone. As in Figure 1, the nozzles may be adjusted and directed so that their sprays are tangential to each other, thus forming a vortex of mixing.

In Figure 3 another form of reactor zone, namely right-angle elbow 40 is shown, into which charge oil flows by line 41. Sulfonating agent enters from line 42, controlled by valve 45, through spray nozzle 44. The reaction mixture is withdrawn at outlet 46. In this arrangement, advantage is taken of the turbulent flow occurring at the right-angle bend and the injection of sulfonating agent at this point gives a highly turbulent mixing action. Gradually increased or decreased velocities of flow, adjusted by the nozzle size or the opening and closing of valves 45 may be used to advantage in the embodiment shown in Figure 3. The direction of oil flow may be opposite to that shown, in which event 46 becomes the inlet and 41 the outlet.

In Figure 4, still another form of reactor 50 is shown, having inlet 51 and outlet 52. Line 53 conveys sulfonating agent to branch line 54, controlled by valve 55 and leading to spray nozzle 56, and to branch line 57, through valve 58 into spray nozzle 59. The reactor body has constriction 60, which, in cooperation with the opposing spray nozzles, forms a mixture zone. Either or both of the spray nozzles may be used at any one time.

In order to illustrate the invention, experiments were conducted employing different methods of combining the sulfonating agent and oil. In these experiments an attempt was made to maintain substantially constant conditions of treatment, and such variations as appeared were entirely due to the inherent nature of the techniques explored, except where indicated. The results attained in these experiments are summarized in the table following the examples.

EXAMPLE 1

In this run, 173 grams of a 200 vis., 85 VI neutral oil, obtained by solvent refining from a Mid-Continent, naphthenic-base crude oil, were diluted with 200 cc. of ethylene chloride and the resulting solution was placed in a 1000 cc. burette. This solution was fed to a constant-head reservoir from which it flowed by gravity to a pipe-T which contained in one leg a nozzle for the introduction of the sulfonating agent. The nozzle consisted of a short length of 1/8" O. D. stainless steel tubing with its outlet end pinched to a small slit. This caused the sulfonating agent to be sprayed in a fine mist and under high pressure caused the sulfonating agent to be instantly dispersed throughout the oil-solvent phase when submerged therein. The length of the slit was about 1/64" and the width was only a few thousandths of an inch. The sulfonating agent, consisting of 17.3 grams of sulfur trioxide in 167 cc. of ethylene chloride, was forced from a stainless steel pressure vessel by a pressure of 50 p. s. i. g. out through the nozzle and into the flowing oil stream. The addition of sulfonating agent took 2½ minutes, and since no cooling was provided, the temperature of the reaction mixture increased to 105° F. The product was collected in a beaker after passing through a coil formed from a five-foot length of ¼" copper tubing. No sludge precipitated and the product was neutralized with excess barium hydroxide dissolved in hot water. After neutralization with the pure barium hydroxide solution and removal of the solvent and water, a clear product was obtained. This product contained 16.6 wt. percent sulfated ash, and had a total base number of 25.7. About 56% of the total acid content was found to be mahogany sulfonic acids.

EXAMPLE 2

In this run, 313.5 gms. of 200 vis., 85 VI neutral oil obtained by conventional refining procedures from a Mid-Continent naphthenic base crude oil were placed in a glass vessel and 400 cc. of ethylene chloride were added amounting to a solvent-to-oil ratio of 1.0. The mixture was cooled to —13° F. by means of a dry-ice acetone bath surrounding the glass vessel. The mixture was stirred violently by means of a Brooks Counter-Rotating mixer while 18.8 gm. of $SO_3$, dissolved in 30 cc. of ethylene chloride were added slowly through a capillary tube. The addition took about fifteen minutes. The solvent-to-$SO_3$ ratio in the sulfonating agent was about 4.

EXAMPLE 3

This experiment was conducted like Experiment 2 except that a solvent/oil ratio of 10 and a solvent/$SO_3$ ratio of 10 was used, the $SO_3$-ethylene chloride mixture was added over a 36 minute period to the oil-solvent mixture through a capillary tube, and a free magnet operated as a stirrer to accomplish gentle mixing.

EXAMPLE 4

Eighty gms. of finished neutral oil and 184 cc. of ethylene chloride were placed in a beaker and gently agitated with a stirring rod while about 3.9 gms. of sulfur trioxide dissolved in 43 cc. of ethylene chloride were slowly poured in over a period of 2 minutes. The reaction temperature was 32° F. This proportion of reagents gave a solvent/oil ratio of 2.0 and a solvent/$SO_3$ ratio of 20.0. An appreciable amount of sludge was produced.

EXAMPLE 5

In this experiment the oil and sulfur dioxide were introduced into a common, level line or conduit by gravity flow through a glass Y tube, the arms of which were sized in proportion to the quantities of the reactants flowing through them. The solvent-to-oil ratio was maintained at 2.0, and the solvent-to-sulfur-trioxide ratio at 5.0. The mixing was conducted at 35° F., and the flow rate of the oil-solvent mixture was about 100 cc./min.

EXAMPLE 6

In this run, 316.6 grams of the same oil as used in the preceding examples was diluted with 728 cc. of ethylene chloride to give a solvent/oil ratio of 2.0, and the resulting solution was placed in a 1000-cc. burette. This solution was fed to a constant-head reservoir, pipe T and coil as in Example 2. Then 15.8 grams of sulfur trioxide in 65 cc. of ethylene chloride, giving a solvent/oxide ratio of 8:1, were forced from a stainless steel pressure vessel (by a pressure of 50 p. s. i. g.) out through the nozzle contained in the pipe T, and into the flowing oil stream. The sulfonation reaction was complete in 2.66 minutes at an average temperature of 32° F. The product showed a 30.9 total sulfonic acid number (calc.), and a mahogany sulfonic acid number (calc.) of 21.4. The nominal yield of total acids was 92.5%.

EXAMPLE 7

In this experiment, 222.6 gms. of the same oil as used in Example 1 was treated with 11.1 gram of $SO_3$ (5 wt. percent) in the same manner as in Example 3 except that the solvent-to-oil ratio was increased to 2:1, and the solvent-to-$SO_3$ ratio was increased to 10:1. The addition was made very quickly (15 sec.) and the temperature of sulfonation was slightly higher, —4° F.

EXAMPLE 8

In this run, 795.0 gms. of a neutral oil similar to that used in Example 1 were treated with 36.7 gms. of $SO_3$ in a new unit which utilized the same nozzle and T described in Example 1, but employed a pump to charge the oil-solvent solution continuously and a pressure tank to charge the sulfur trioxide-solvent solution. Rotometers were used to measure flow rates and a stream sample was taken. Solvent-to-oil and solvent-to-$SO_3$ ratios were 2:1 and 10:1, respectively. The temperature of the reaction mixture was 40° F. The sample represented 5 minutes running time. The nozzle pressure drop was about 70 p. s. i. a.

EXAMPLE 9

A stream sample representing 677 gms. of oil and 49.4 gms. of $SO_3$ (7.3 wt. percent) was taken from the above apparatus while operating at 100° F. Again the stream sample represented 5 minutes running time, but the solvent-to-oil ratio was reduced to 1:1. The pressure drop across the nozzle was also about 70 p. s. i. a.

The results of these experiments are set forth in the following Table I:

Table I.—*Summary of experimental results on SO₃ sulfonation of a lubricating oil*

| Ex. No. | Process | Wt. Percent Treat. (SO₃) | Vol. Ratios Solv./oil | Vol. Ratios Solv./SO₃ | Temp., °F. | Calc. Total Acid Number | Calc. Mah. Acid Number | Nom. Yields, Total Acids | Nom. Yields, Mahogany Acids | Remarks |
|---|---|---|---|---|---|---|---|---|---|---|
| 1 | Spray | 8.0 | 1.0 | 20 | 75 | 60.4 | 33.5 | 116 | 55.5 | |
| 2 | Violent mixing | 6.0 | 1.0 | 4.0 | −13 | 40.2 | 22.6 | 101.2 | 56.9 | |
| 3 | Mixing | 9.8 | 10 | 10 | 32 | 29.7 | | 47.5 | | |
| 4 | Simple Mixing | 5.0 | 2.0 | 20 | 35 | Ex. Sludge | | <50.0 | | sludge formed. |
| 5 | Confluent flow | 5.0 | 2.0 | 5.0 | 35 | 18.1 | | 54.1 | | |
| 6 | Spray | 5.0 | 2.0 | 8 | 35 | 30.9 | 21.4 | 92.5 | 64.1 | |
| 7 | Violent mixing | 5.0 | 2.0 | 10 | −4 | 31.2 | 22.0 | 93.5 | 65.9 | |
| 8 | Spray | 4.6 | 2.0 | 10 | 40 | 26.9 | 20.1 | 87.1 | 65.1 | |
| 9 | Spray | 7.3 | 1.0 | 10 | 100 | 51.7 | 33.2 | 108.8 | 69.7 | |

In each case the products were neutralized with an excess of barium hydroxide octahydrate, substantially the same finishing procedures were used, and the total ash, base number and mahogany acid contents of the finished crude sulfonates were determined. To determine the mahogany acid content, a 10 gm. sample of the finished sulfonate was dissolved in 90 cc. of a 60–30 amyl alcohol-benzene solvent. This solution was contacted with 30 cc. of a 5% sulfuric acid solution. The acid solution, containing barium sulfate, was removed and the solvent solution containing mahogany sulfonic acids was washed twice with 10 cc. portions of water. The solvent solution was then filtered through filter aid, treated with barium hydroxide octahydrate to reform the sulfonate, and evaporated to constant weight. The ash and base number were then determined and the total acid content was calculated by the following formula:

Acid No.=

$$\frac{4.8(\text{wt. percent ash}) - (\text{base No.})}{1 - .0058(\text{wt. percent ash}) - .00032(\text{base No.})}$$

This acid number was termed the mahogany acid number and was compared with the acid number which would have been obtained if all of the sulfur trioxide used in the process had been converted to mahogany acid, in determining the yield of mahogany acid reported in the table. Although this method is somewhat empirical, it was found to give reproducible results, and therefore, was a sound basis for correlating the data.

As seen from the table, the total acid yield is greatly increased by using the spray method at 35° F. (Ex. 6) over that obtained when the reactants are merely brought into confluence without turbulent flow conditions as in Example 5. Examples 1, 6, 8, and 9 show that a high treating level may be used, as may higher temperatures, without seriously increasing multiple sulfonation and green acid formation.

The foregoing examples and discussion make it apparent that the invention in its broadest aspects relates to the discovery that by employing turbulent flow conditions within the liquid phase of sulfonatable material present in the reaction zone using sulfur trioxide in the presence of a diluent for all phases present and assuring a pressure drop of at least about 50 p. s. i. g. between the sulfonating agent and sulfonatable material, superior yields of high quality sulfonic acids are obtained. This technique avoids heat buildup, such side reactions as oxidation and multiple sulfonation, and allows the reaction to proceed under conditions of highest yield and selectivity. It is also apparent that the invention which has been described in relation to the treatment of mineral oils is also applicable to the treatment of other sulfonatable materials with a sulfonating agent containing sulfur trioxide. Thus beneficial results are obtained as long as the sulfonating agent is injected into a flowing stream or quiescent body of sulfonatable material under turbulent flow conditions and with the prescribed pressure drop. In this regard the conditions applied as to sulfonating temperature, ratios of reactants, and velocities of flow, etc. are all subject to variations within the skill of the art, depending upon the type of sulfonatable material used and the results desired.

Thus, as to the sulfonatable material used, the invention may be applied to any liquid organic material capable of sulfonation with sulfur trioxide or sulfur trioxide-containing or producing materials. Such sulfonatable materials as oleaginous substances, hydrocarbons, petroleum fractions, lubricating oils, aromatic fractions, unsaturated hydrocarbons, solvent extracts from the purification and manufacture of lubricating oils including neutrals and bright stocks, unsaturated fatty oils, fatty acids, and their esters, unsaturated ring compounds and the like, may be used. As long as the sulfonatable material may be caused to flow under turbulent conditions through a reaction zone while mixing with an injected stream of diluted sulfur trioxide-containing sulfonating agent or be brought from a quiescent state to turbulent flow conditions by such injection under the prescribed pressure drop or pressure differential under reaction conditions designed to promote the desired sulfonation, the advantages of the invention may be obtained.

Although a lower limit of about 50 p. s. i. g. has been prescribed for the pressure drop of the sulfonating agent as it passes into the sulfonatable material, this limitation attaches generally to materials having a viscosity of about 100 to 200 Saybolt Universal seconds, such as mineral oils wherein the advantages of the invention are particulary pronounced. In using sulfonatable materials of lesser viscosities the admixture of same with the sulfonating agent under turbulent flow conditions may be obtained at lesser pressure differentials. Dependence may be had by one skilled in the art on the regulation of the Reynolds number of the flowing less viscous sulfonatable material to obtain the proper conditions of turbulence. For this purpose, the flow conditions necessary are produced by suitable baffling of the reactor and by maintaining the Reynolds number at a value of over about 3000, as before stated, while maintaining a single zone of mixing. Thus, higher pressure drops between the sulfonating agent and sulfonatable material are feasible and point to more favorable results with certain sulfonatable materials of the broad class mentioned. Pressure drops of 70 p. s. i. g. to as high as 100 to 150 p. s. i. g. may be used to advantage with certain sulfonatable materials depending on the reaction conditions imposed, the ease of sulfonation of the reactants, and the results desired. The upper limit of the pressure drop is limited only by the capacities of the equipment employed, particularly the design of pumps, valves and nozzles used. In general, the reaction temperature is from about 32° F. to as high as 110° F.

The invention has particular application to the sulfonation of viscous sulfonatable materials such as mineral oils and hydrocarbon mixtures of petroleum origin wherein temperature control, multi-sulfonation and the like are acute problems. The preparation of petroleum sulfonic acid salts which are compatible with refined mineral lubricating oils with which they are used as additives represents a specific application of the invention. It has been found that neutral oils having viscosity indices of about 85 may be transformed into petroleum sulfonates which when blended with refined lubricating oil fractions form a clear, stable product, by applying the techniques described herein.

In relation to this particular problem the examples given make it apparent that the invention is applicable to three different modes of operation when applied to the sulfonation of mineral oils. For simplicity these processes are set forth in tabulated form as follows:

Table II.—Sulfonation of mineral oils at 32° F. or above

| Process | Diluent | | Treating Level | Concentration of SO$_3$ in Sulfonating Agent | | Amt. of diluent in oil phase |
|---|---|---|---|---|---|---|
| | Oil Phase | SO$_3$ Phase | | Vapor Phase | Liquid Phase | |
| #1 | SO$_2$ or EtCl$_2$ | Air, N$_2$ or SO$_2$ | 4-10% by wt. SO$_3$ based on amount of oil. | 4-10 vol. percent | 5-25 Wt. percent of SO$^3$. | At least 1 vol. w./maximum of 3 vols. of diluent per volume of oil. |
| #2 | EtCl$_2$ or Inert Diluent | SO$_2$ or EtCl$_2$ | ___do___ | No vapor phase | ___do___ | Do. |
| #3 | None | SO$_3$ | ___do___ | ___do___ | 1-10 Wt. percent SO$_3$. | None. |

In these processes a liquid phase is always present and the amount of vapor phase will depend on the reaction conditions imposed. Thus, the reaction is carried out in liquid or mixed phase. In the process or technique #1 the preferred diluent for the oil phase is ethylene chloride. The preferred treating level for the three processes is about 4.0 to 8.0 weight percent of sulfur trioxide. In process #1 the preferred concentration of sulfur trioxide in the vapor phase, if present, is about 6.0 volume percent. A concentration of about 5.0 weight percent of sulfur trioxide in the liquid phase of sulfonating agent is preferred in process #3. The amount of diluent in the oil phase is dependent on several factors and becomes important only where highly reactant sulfonatable materials are used and temperature control is difficult.

Although the invention has been described in relation to specific examples, it should be understood that various other modifications and adaptations thereof may be made by those skilled in this particular art without departing from the spirit and scope as set forth in the appended claims.

What is claimed is:

1. The method of producing petroleum sulfonic acids which comprises contacting a flowing stream of a sulfonatable mineral oil at a temperature of above about 32° F. with an injected stream of a sulfonating agent containing sulfur trioxide in a single reaction zone maintained under turbulent flow conditions at a Reynolds number of above about 3000 at the point of injection, the concentration of said sulfur trioxide in said sulfonating agent being about 4.0 to 10.0 weight percent based on the amount of said mineral oil, said respective streams being diluted with a diluent selected from the group consisting of sulfur dioxide, ethylene chloride and inert gases, the pressure of the stream of mineral oil being at least about 50 p. s. i. g. less than the pressure of said stream of sulfonating agent, the amount of said diluent present in the oil phase in said reaction zone being between about 1 volume to 3 volumes per volume of mineral oil, and recovering a separate phase containing petroleum sulfonic acids.

2. The method in accordance with claim 1 in which the mineral oil is a mineral lubricating oil fraction.

3. The method in accordance with claim 2 in which the mineral lubricating oil fracton is a neutral oil having a viscosity index of about 85 to 100 and a viscosity at 100° F. of about 170 to 200 Saybolt Universal seconds.

4. The method in accordance with claim 1 in which the reaction temperature is maintained at a temperature between about 32° F. and 110° F., between about 5.0 to 8.0 weight percent of sulfur trioxide is present in said sulfonating agent and between about 4.0 to 8.0 weight percent of said sulfur trioxide based on the weight of oil used is injected into said oil stream.

5. The method in accordance with claim 1 in which a plurality of streams of said sulfonating agent are injected into said oil stream and at least a part of said injected streams are tangential to each other thereby forming a vortex of mixing in said turbulent zone.

6. The method in accordance with claim 1 in which a plurality of streams of said sulfonating agent are injected into said oil stream and at least two of said injected streams are opposed and in close promixity to each other.

7. The method in accordance with claim 1 in which a plurality of streams of said sulfonating agent are injected into said oil stream and at least one of said injected streams of said sulfonating agent is directed against the direction of flow of said oil stream.

References Cited in the file of this patent

UNITED STATES PATENTS

| 2,691,040 | Bloch et al. | Oct. 5, 1954 |
| 2,722,543 | Anderson | Nov. 1, 1955 |
| 2,768,199 | Luntz et al. | Oct. 23, 1956 |